United States Patent [19]
Parsons

[11] Patent Number: 5,357,823
[45] Date of Patent: Oct. 25, 1994

[54] GEARSHIFT ASSEMBLY FOR MANUAL TRANSMISSIONS

[75] Inventor: George A. Parsons, Grosse Pointe, Mich.

[73] Assignee: New Venture Gear, Inc., Troy, Mich.

[21] Appl. No.: 48,424

[22] Filed: Apr. 14, 1993

[51] Int. Cl.⁵ .............................. F16H 59/04
[52] U.S. Cl. .................... 74/473 P; 74/473 R
[58] Field of Search ................ 74/473 R, 473 P

[56] References Cited

U.S. PATENT DOCUMENTS

| | | | |
|---|---|---|---|
| 3,264,892 | 8/1966 | Boman et al. | 74/473 R |
| 3,315,537 | 4/1967 | Keller | 74/473 P X |
| 4,569,245 | 2/1986 | Feldt et al. | 74/473 P |

FOREIGN PATENT DOCUMENTS

WO89/12856  12/1989  PCT Int'l Appl. .......... 74/473 P

OTHER PUBLICATIONS

Component Manufacturing–The NV 4500 Transmission for Light and Medium Duty Trucks (Varma, Ahluwalia, Dolan, Hatton, Phelan, Simmons, Socin) pp. 453–458, Prior Apr. 14, 1993.

*Primary Examiner*—Allan D. Herrmann
*Attorney, Agent, or Firm*—Harness, Dickey & Pierce

[57] ABSTRACT

The present invention gearshift assembly for a motorized vehicle manual transmission comprises a gearshift lever having an upper ball which determines a crossover pivot ratio and a lower ball which determines a different linear pivot ratio. Also, a uniquely shaped socket transfers the upper ball's crossover movement and the lower ball's linear movement to the attached shift rail. The socket has a pair of lateral walls, a short forward facing wall, a short rearward facing wall, and a cavity therewithin.

15 Claims, 3 Drawing Sheets

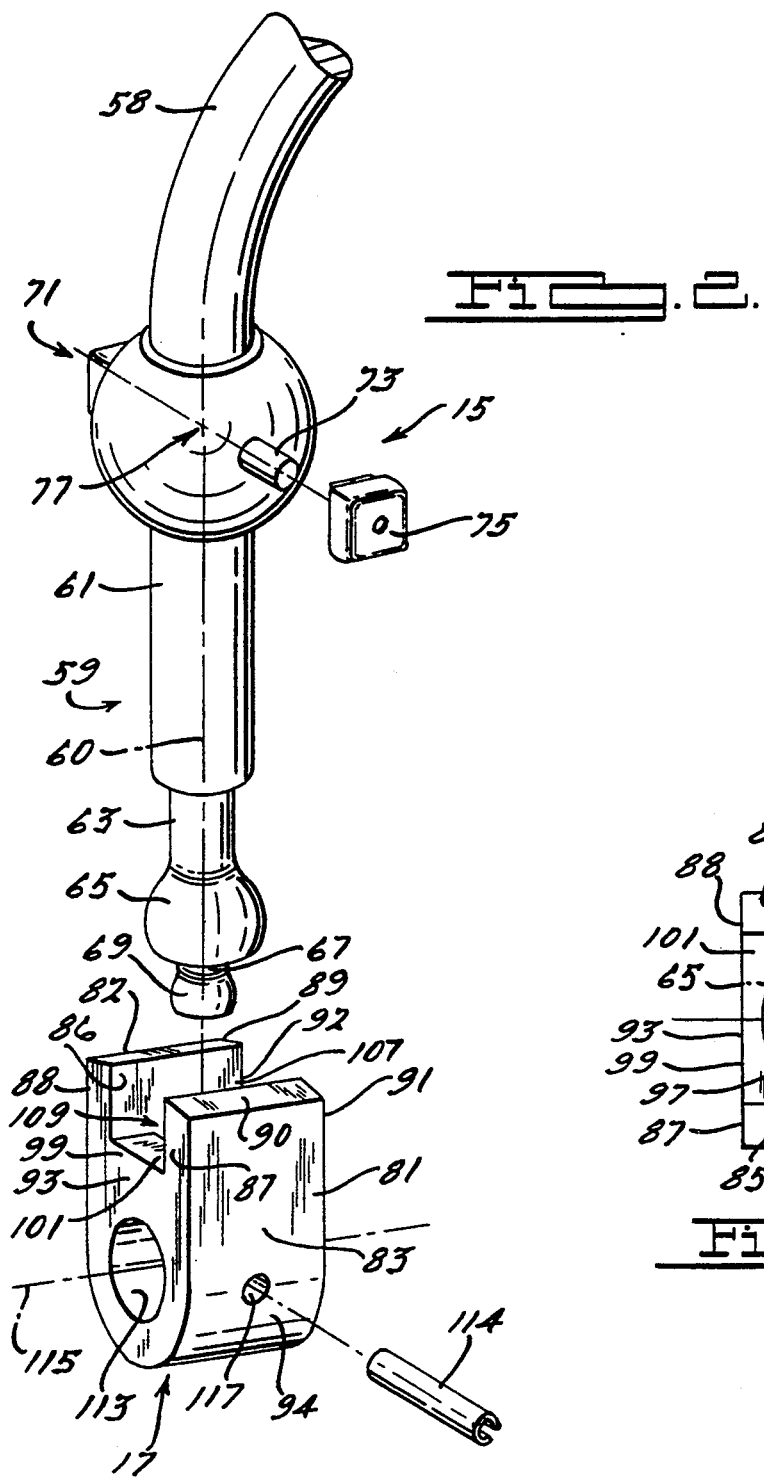

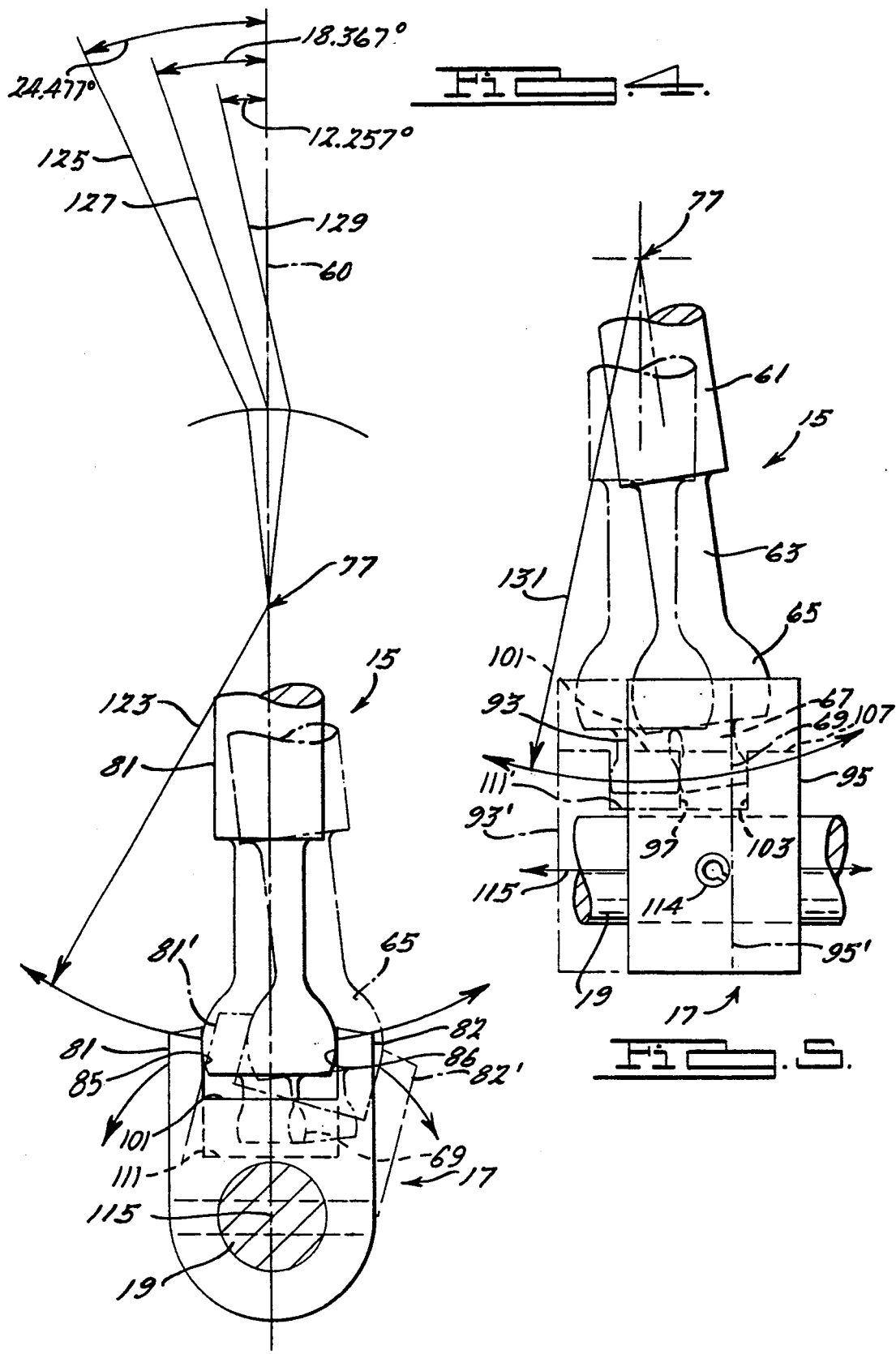

GEARSHIFT ASSEMBLY FOR MANUAL TRANSMISSIONS

BACKGROUND OF THE INVENTION

This invention relates generally to gearshift assemblies for motorized vehicle manual transmissions and specifically to a socket and a gearshift lever having an upper ball and a lower ball thereby providing for different pivot ratios in crossover and linear directions.

As is known, conventional manual transmissions are typically equipped with a gearshift assembly which permits a vehicle operator to selectively shift between various forward ratio gears and a reverse gear. The gearshift assembly includes a tower housing secured to an exterior surface of the transmission casing and a gearshift lever that is operably coupled to a socket and shift rail. Typically, such an assembly has a standardized shift pattern such that the shift lever is movable along a neutral crossover path to a plurality of preselected gate positions, each of which defines a linear shift plane for a pair of ratio gears. Most commonly, the gate position located at one end of the neutral crossover path defines the linear shift plane between the first and second gears while the gate position at the opposite end of the neutral crossover path usually defines a shift plane between the highest forward ratio gear position (i.e., fifth gear) and the reverse gear position.

These traditional gearshift levers have a pivot mechanism and a single lower ball, such that the distance therebetween defines a pivot ratio. Thus, pivotal movement along the neutral crossover path and the linear shift planes, as dictated by the gearshift lever pivot ratio causes rotational and translating movement of the socket and shift rail. However, conventional crossover and linear pivot ratios must be identical due to the common pivot point and singular ball. As such, it is often awkward for the vehicle operator to manipulate the gearshift lever. While such design constraints have herebefore been recognized, most viable alternatives would require portions of the high-volume manual transmissions to be redesigned and/or retooled.

SUMMARY OF THE INVENTION

The present invention is therefore directed to overcoming the disadvantages commonly associated with traditional gearshift assemblies by providing for different crossover and linear pivot ratios. In accordance with the present invention, the preferred embodiment of a gearshift assembly for a motorized vehicle manual transmission comprises a gearshift lever having an upper ball which determines the crossover pivot ratio and a lower ball which determines a different linear pivot ratio. Also, a uniquely shaped socket transfers the upper ball's crossover movement and the lower ball's linear movement to the attached shift rail. The socket has a pair of lateral walls, a short forward facing wall, a short rearward facing wall, and a cavity therewithin. Therefore, the present invention allows for improved shift lever packaging and operator convenience while being used with a conventional manual transmission. Moreover, the distance between the upper and lower balls, and the pivot point can be reduced which, in turn, reduces the height of the tower housing.

Additional advantages and features of the present invention will become apparent from the following description and appended claims, taken in conjunction with the accompanying drawings.

BRIEF DESCRIPTION OF THE DRAWINGS

FIG. 2 is an exploded perspective view showing the gearshift lever and socket of the gearshift assembly from FIG. 1;

FIG. 3 is a plan view showing the upper and lower balls of the gearshift lever in relation to the socket of the gearshift assembly from FIG. 1;

FIG. 4 is a front elevation view showing the gearshift lever and socket of the gearshift assembly from FIG. 1 depicting their rotational movement along the neutral crossover path; and FIG. 5 is a side elevation view showing the gearshift lever and socket of the gearshift assembly from FIG. 1 depicting their linear movement from one ratio gear position to another along the same linear shift plane.

DETAILED DESCRIPTION OF THE PREFERRED EMBODIMENT

Figure 1:
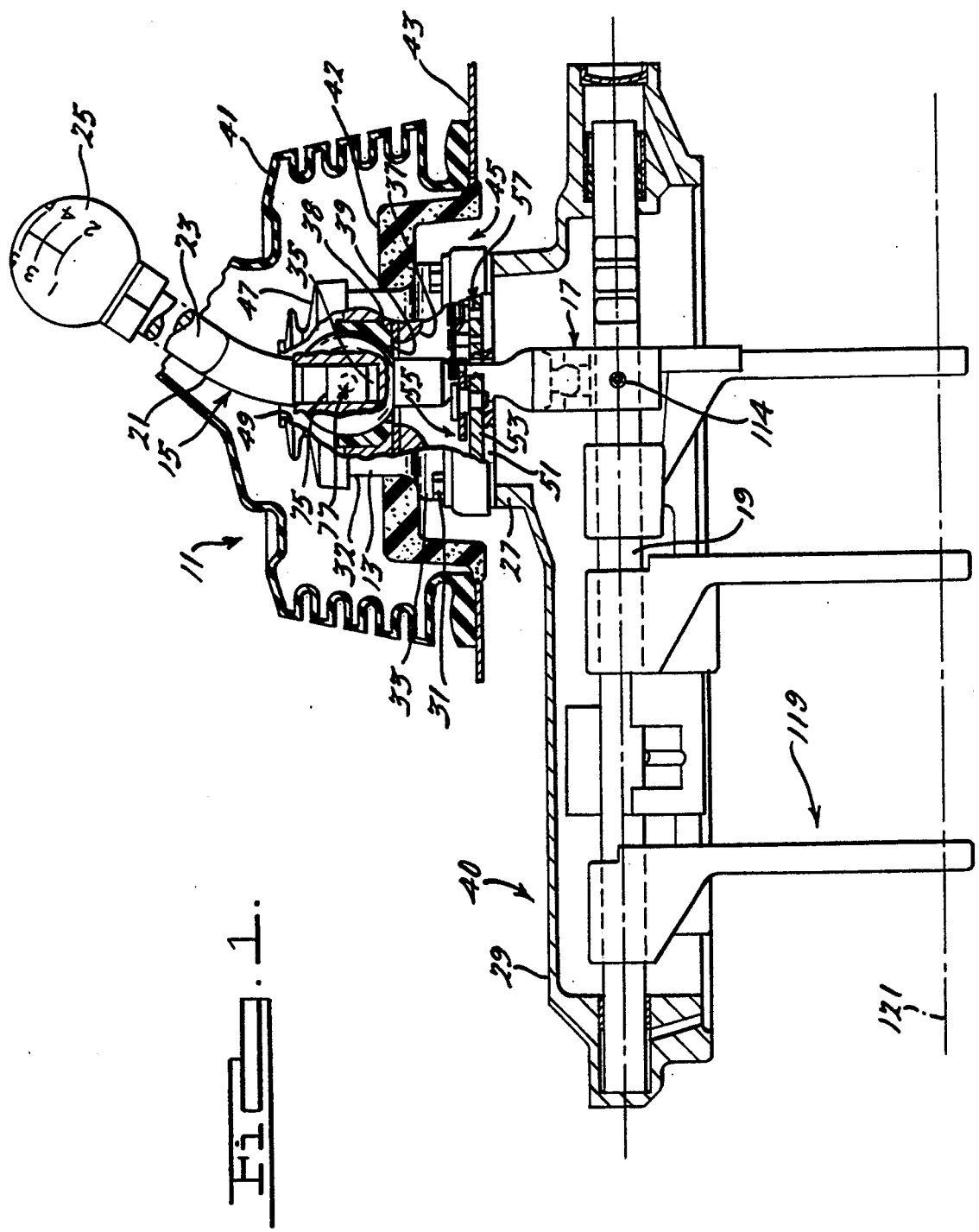
FIG. 1 is a side elevation view, partially in section, showing a gearshift assembly constructed according to a preferred embodiment of the present invention.

In general, the present invention is directed to a gearshift assembly 11 of the type which permits a motorized vehicle operator to selectively shift a multi-speed manual transmission. Referring to FIG. 1, the preferred embodiment of gearshift assembly 11 comprises a tower housing 13, a set of elastomeric boots, a unique gearshift lever 15, a unique socket 17 and a shift rail 19. Due to assembly constraints, gearshift lever 15 has an upper end 21 with a shift lever extension 23 mounted thereupon. Furthermore, a shifter knob 25 is located at the top of shift lever extension 23 for operator accessibility.

Tower housing 13 is secured to an upper bore 27 in the exterior of a transmission casing 29 by a plurality of bolts 31. Tower housing 13 is of conventional design, having a hollow cylindrical portion 32 and an expanded mounting portion 33 therebelow. Furthermore, tower housing 13 has a pair of vertical grooves 35 formed within an inside surface 37 of cylindrical portion 32 and oppositely facing one another. Tower housing 13 is preferably made from a glass-fiber filled polymeric material, however, it may also be produced from cast aluminum. Moreover, a polymeric cup 38 is inserted within inside surface 37 of cylindrical portion 32. This cup 38 has cutouts (not shown) which correspond with grooves 35 and has an aperture 39 in the floor thereof.

A set of elastomeric boots surround portions of gearshift assembly 11 in order to isolate vibrations and to reduce acoustic noise from entering the passenger compartment from the transmission assembly 40. A flexible aesthetic boot 41 surrounds tower housing 13 and gearshift lever 15; boot 41 is retained to a floor pan 43 through conventional methods. Also, a sponge rubber boot 42 surrounds the bottom of cylindrical portion 32 and similarly attaches to floor pan 43. Boots 41 and 42 serve to reduce acoustic noise from entering the gap 45 between floor pan 43 and upper bore 27 of transmission casing 29. Furthermore, an elastomeric cap 47 is mounted upon the top edge of cylindrical portion 32 of tower housing 13. Gearshift lever 15 extends through an opening 49 therein. Moreover, an annular shaped elastomeric isolator 51 and an annular shaped steel plate 53 are mounted upon upper bore 27 with gearshift lever 15 extending centrally therethrough. A reverse gear lockout mechanism 55 and a spring actuated biasing means 57 can also be mounted upon steel plate 53; such a reverse gear lockout 55 and biasing means 57 are described in a pending U.S. patent application Ser. No. 954,328, entitled "Manual Transmission Shifter Assembly With Reverse Inhibitor," invented by the present inventor for the same assignee.

Referring to FIGS. 1 and 2, the preferred embodiment of the present invention gearshift lever 15 and socket 17 are shown. The gearshift lever 15 has an upper angled portion 58 and a shaft 59. Shaft 59 creates a vertical axis 60. This shaft 59 comprises a cylindrical center portion 61 and a cylindrical necked portion 63 upon which is attached an upper bearing surface such as an upper ball 65, an extension 67 and a lower bearing surface such as a lower ball 69. Mounted on cylindrical center portion 61 is a pivot mechanism 71 which is spherical in shape, having a pair of dowels 73 extending horizontally outward therefrom with a hexagonal-shaped lug member 75 rotationally affixed thereupon. Pivot mechanism 71 is received within cup 39 of tower housing 13 and each lug member 75 is slidably mounted within a corresponding groove 35 of tower housing 13. Thus, a pivot point 77 is centrally established along vertical axis 60 thereby providing for multi-directional pivotal movement of gearshift lever 15. Such a pivot mechanism 71 is known to one skilled in the art. Cylindrical center portion 61 tapers to cylindrical-shaped necked portion 63 which extends vertically therebelow. This necked portion 63 extends through a central aperture in steel plate 53 and rubber isolator 51. Upper ball 65 is juxtapositioned below necked portion 63. Upper ball 65 is spherically shaped and has an outside diameter no larger than that of cylindrical center portion 61; this allows for easier manufacturing of gearshift lever 15. A short extension 67 extends vertically below upper ball 65 and retains lower ball 69 thereupon. Lower ball 69 is also spherically shaped but has a substantially smaller outside diameter than does upper ball 65. Gearshift lever 15 is made from powdered metal or carbon steel, SAE grade 8620.

As can best be observed in FIGS. 2 and 3, socket 17 has a pair of lateral side walls 81 and 82, which have outside surfaces 83 and 84, and inside surfaces 85 and 86, bordered by forward edges 87 and 88, upper edges 89 and 90, and rearward edges 91 and 92. The outside surfaces 83 and 84, blend into a partially cylindrical bottom formation 94. Socket 17 also has a forward facing wall 93 and a rearward facing wall 95. Forward facing wall 93 has an inside face 97, an outside face 99 and a horizontal top edge 101. Similarly, the rearward facing wall 95 has an inside face 103, an outside face 105 and a horizontal top edge 107. Forward and rearward facing walls 93 and 95, respectively, join with inside surfaces 85 and 86, of lateral side walls 82 and 83, respectively. Top edges 101 and 107, of forward and rearward facing walls 93 and 95, respectively, are shorter in height than upper edges 89 and 90, of lateral side walls 81 and 82, respectively. Furthermore, inside surfaces 85 and 86, and inside faces 87 and 103, form an elongated cavity 109 therewithin. Cavity 109 is elongated toward lateral side walls 81 and 82, and has a floor 111 therebelow. In addition, socket 17 has a cylindrical tunnel 113 centrally positioned within bottom formation 94 and below floor 111 of cavity 109. Tunnel 113 runs from forward facing wall 93 through rearward facing wall 95 and has a linear axis 115 centrally therein. Also, a cylindrical duct 117 extends from one lateral wall 81 through the other lateral wall 82 thereby intersecting tunnel 113 along linear axis 115.

Referring to FIGS. 1-3, shift rail 19 is contained within transmission casing 29 and is a substantially cylindrical rod serving to retain a plurality of shift forks 119. These shift forks 119 aid in changing ratio gears located on the adjacent output shaft, the centerline of which is noted as 121. Furthermore, shift rail 19 extends through tunnel 113 of socket 17 along linear axis 115. Socket 17 is secured to shift rail 19 by a rolled spring steel pin 114 inserted through duct 117 and an aligned passage within shift rail 19. Accordingly, shift rail 19 can rotate about linear axis 115 and can translate fore and aft in the direction of linear axis 115. Socket 17 is made from powdered metal or carbon steel, SAE grade 8620.

As can best be seen in FIGS. 3 and 4, when the vehicle operator moves knob 25 and shift lever extension 23, gearshift lever 15 will correspondingly actuate socket 17 which, in turn, moves shift rail 19. Specifically, when gearshift lever 15 is moved along its neutral crossover plane, it will pivot about point 77 and cause upper ball 65 to push against an inside surface 85 or 86 of a respective one of lateral side wall 81 or 82. This will rotate socket 17 about its linear axis 115 to an exemplary position such as that noted as 81' and 82'. Thus, the distance between pivot point 77 and the center of upper ball 65 creates a crossover pivot ratio 123. This can best be seen in FIG. 4. For example, the first and second gear gate position 125 is set at 24.477 degrees from vertical axis 60; the third and fourth gear gate position 127 is set at 18.367 degrees from vertical axis 60; and, the fifth and reverse gear gate position 129 is set at 12.257 degrees from vertical axis 60. Therefore, given crossover pivot ratio 123, the movement of upper angled portion 58 (See FIG. 2) of gearshift lever 15 from one extreme gate position to another along the neutral crossover plane causes socket 17 to rotate approximately 15 degrees about its linear axis 115.

Referring to FIGS. 3 and 5, lower ball 69 contacts inside face 97 of forward facing wall 93 and inside face 103 of aft facing wall 95. Thus, when the vehicle operator places gearshift lever 15 into a linear gear position, for example second gear, lower ball 69 will push socket 17 forward along linear axis 115 such that forward facing wall 93 and rearward facing wall 95 are then in positions 93' and 95'; this provides for approximately 11 millimeters of linear movement of socket 17 and, in turn, shift rail 19. The distance between pivot point 77 and the center of lower ball 69 forms a linear pivot ratio 131 which is independent and different from crossover pivot ratio 123.

It will be appreciated that the gearshift lever and socket of the present invention represents a significant packaging improvement over the prior art since the crossover pivot ratio and the linear pivot ratio can be different. The present invention provides for this difference through an upper ball and lower ball, each having their own pivot ratio. Moreover, a uniquely designed socket accommodates this dual pivot ratio gearshift lever design while being suitable for use in a common transmission package.

While a preferred embodiment of this gearshift assembly has been disclosed, it will be appreciated that various modifications may be made without departing from this present invention. For example, the upper and lower balls may be vibrationally isolated from the cylindrical center portion of the gearshift lever as would be known to one skilled in the art. Furthermore, a gearshift lever and socket of the present invention may have different crossover pivot ratios, gate plane angles, and differences in the socket's crossover and linear movement. While various materials have been disclosed in an exemplary fashion, various other materials may of course be employed. It is intended by the following claims to cover these and any other departures from these disclosed embodiments which fall within the true spirit of this invention.

The invention claimed is:

1. A gearshift assembly for permitting a vehicle operator to selectively shift between a plurality of ratio gear positions within a multi-speed manual transmission, comprising:
   a shift mechanism being operable to translate in a linear direction and being operable to rotate about its linear axis, said shift mechanism having a plurality of shift forks attached thereto for controlling a plurality of transmission gears;
   a gearshift lever having a pivot means thereupon for providing pivotal movement in said linear direction and a neutral crossover direction, said gearshift lever further having an upper bearing surface which determines a crossover pivot ratio and a lower bearing surface which determines a different linear pivot ratio; and
   a socket being operable to transfer said upper bearing surface's crossover movement and said lower bearing surface's linear movement to said attached shift mechanism, said shift mechanism attached to said socket substantially below said lower bearing surface.

2. The gearshift assembly of claim 1 wherein:
   said socket is defined by a pair of lateral side walls each having an outside surface and an inside surface bordered by a substantially vertical forward edge, a substantially horizontal upper edge and a substantially vertical rearward edge, said socket is further defined by a forward facing wall having a first outside face and a first inside face bordered by a first substantially horizontal top edge lower in height than said upper edges of said pair of lateral side walls, said socket also is defined by a rearward facing wall with a second outside face and a second inside face bordered by a second substantially horizontal top edge also being lower in height than said upper edges of said pair of lateral side walls, said forward facing wall and said rearward facing wall are joined to said pair of lateral side walls, said inside surfaces and said inside faces further act to define a cavity centrally located therewithin, said cavity is elongated in a direction toward said pair of lateral side walls, said socket has a cylindrical tunnel juxtapositioned below said cavity and extending from said first outside face of said forward facing wall to said second outside face of said rearward facing wall, said tunnel is interposed around said linear axis, said shift mechanism extends along said linear axis through said tunnel within said socket and is secured to said socket; and
   said gearshift lever has an elongated shaft extending vertically therebelow said pivot means, said shift lever further has said upper bearing surface and said lower bearing surface extending vertically therebelow, said upper bearing surface cooperatively fits between said lateral side walls' inside surfaces of said socket and said lower bearing surface cooperatively fits within said cavity of said socket between said inside surface of said forward facing wall and said inside surface of said rearward facing wall;
   whereby when said vehicle operator pivots said gearshift lever along said neutral crossover direction, said upper bearing surface acts to rotationally push against one of said pair of lateral side walls thereby rotating said socket and said shift mechanism about said linear axis and when said vehicle operator pivots said gearshift lever along a ratio gear engaging direction, perpendicular to said neutral crossover direction, said lower bearing surface acts to push against said forward facing wall or said rearward facing wall within said cavity thereby moving said socket and said shift mechanism fore and aft along said linear axis.

3. The gearshift assembly of claim 2 wherein said elongated shaft of said gearshift lever is cylindrically-shaped and said upper and lower bearing surfaces are substantially spherically-shaped balls.

4. The gearshift assembly of claim 3 wherein said gearshift lever has a necked portion of smaller diametral cylindrical cross section than that of said elongated shaft, said necked portion being positioned vertically between said elongated shaft and said upper bearing surface, said upper bearing surface being of larger diameter than said necked portion and said smaller bearing surface being of smaller diametral size than said upper bearing surface.

5. The gearshift assembly of claim 2 further comprising:
   said pivot means being defined by a spherically shaped member mounted along a portion of said elongated shaft and having a pair of dowels extending horizontally outward therefrom, each of said pair of dowels having a hexagonal-shaped lug member rotationally affixed thereupon;
   a tower housing having a hollow cylindrically-shaped upper portion with an inner cylindrically-shaped surface therein, said inner surface having a pair of oppositely facing vertical grooves proximate thereto; and
   said lug members being engaged within said pair of vertical grooves for slidable vertical movement, whereby said gearshift lever is operably pivotable in said neutral crossover direction and in said linear direction.

6. The gearshift assembly of claim 2 wherein said socket has a duct running through said tunnel normal to said linear axis, said socket is secured to said shift mechanism by insertion of a cylindrical pin through said duct and through a corresponding passage within said shift mechanism.

7. The gearshift assembly of claim 1 wherein said shift mechanism is a rail having a cylindrical rod-shaped configuration.

8. The gear shift assembly of claim 1 wherein:
   said shift mechanism linearly extends through said socket and is journalled for rotation along portions of said shift mechanism protruding from forward and rearward facing walls of said socket.

9. A gearshift assembly for permitting a vehicle operator to selectively shift between a plurality of ratio gear positions within a multi-speed manual transmission, comprising:
   a gearshift lever having a pivot means thereupon for providing pivotal movement in said linear direction and a neutral crossover direction, said gearshift lever further having an upper bearing surface which determines a crossover pivot ratio and a lower bearing surface which determines a different linear pivot ratio; and a socket being operable to transfer said upper bearing surface's crossover movement and said lower bearing surface's linear movement, a shift mechanism attached to said socket substantially below said lower bearing surface.

10. The gearshift assembly of claim 9 wherein:

said socket is defined by a pair of lateral side walls each having an outside surface and an inside surface bordered by a substantially vertical forward edge, a substantially horizontal upper edge and a substantially vertical rearward edge, said socket is further defined by a forward facing wall having a first outside face and a first inside face bordered by a first substantially horizontal top edge lower in height than said upper edges of said pair of lateral side walls, said socket also is defined by a rearward facing wall with a second outside face and a second inside face bordered by a second substantially horizontal top edge also being lower in height than said upper edges of said pair of lateral side walls, said forward facing wall and said rearward facing wall are joined to said pair of lateral side walls, said inside surfaces and said inside faces further act to define a cavity centrally located therewithin, said cavity is elongated in a direction toward said pair of lateral side walls, said socket has a tunnel juxtapositioned below said cavity and extending from said first outside face of said forward facing wall to said second outside face of said rearward facing wall, said tunnel is interposed around said linear axis; and said gearshift lever has an elongated shaft extending vertically therebelow said pivot means, said shift lever further has said upper bearing surface and said lower bearing surface extending vertically therebelow, said upper bearing surface cooperatively fits between said lateral side walls' inside surfaces of said socket and said lower bearing surface cooperatively fits within said cavity of said socket between said inside surface of said forward facing wall and said inside surface of said rearward facing wall;

whereby when said vehicle operator pivots said gearshift lever along said neutral crossover direction, said upper bearing surface acts to rotationally push against one of said pair of lateral side walls thereby rotating said socket about said linear axis and when said vehicle operator pivots said gearshift lever along a ratio gear engaging direction, perpendicular to said neutral crossover direction, said lower bearing surface acts to push against said forward facing wall or said rearward facing wall within said cavity thereby moving said socket fore and aft along said linear axis.

11. The gearshift assembly of claim 10 wherein said elongated shaft of said gearshift lever is cylindrically-shaped and said upper and lower bearing surfaces are substantially spherically-shaped balls.

12. The gearshift assembly of claim 11 wherein said gearshift lever has a necked portion of smaller diametral cylindrical cross section than that of said elongated shaft, said necked portion being positioned vertically between said elongated shaft and said upper bearing surface, said upper bearing surface being of larger diameter than said necked portion and said smaller bearing surface being of smaller diametral size than said upper bearing surface.

13. The gearshift assembly of claim 10 further comprising:

said pivot means being defined by a spherically shaped member mounted along a portion of said elongated shaft and having a pair of dowels extending horizontally outward therefrom, each of said pair of dowels having a hexagonal-shaped lug member rotationally affixed thereupon;

a tower housing having a hollow cylindrically-shaped upper portion with an inner cylindrically-shaped surface therein, said inner surface having a pair of oppositely facing vertical grooves proximate thereto; and said lug members being engaged within said pair of vertical grooves for slidable vertical movement, whereby said gearshift lever is operably pivotable in said neutral crossover direction and in said linear direction.

14. The gear shift assembly of claim 9 wherein:

said shift mechanism linearly extends through said socket and is journalled for rotation along portions of said shift mechanism protruding from forward and rearward facing walls of said socket.

15. A gearshift assembly for permitting a vehicle operator to selectively shift between a plurality of ratio gear positions within a multi-speed manual transmission, comprising:

a gearshift lever providing pivotal movement in said linear direction and a neutral crossover direction, said gearshift lever further having an upper bearing surface which determines a crossover pivot ratio and a lower bearing surface which determines a different linear pivot ratio;

a socket being operable to transfer said upper bearing surface's crossover movement and said lower bearing surface's linear movement; and a shift rail linearly extending through said socket and being journalled for rotation along portions of said shift rail protruding from forward and rearward facing walls of said socket.

* * * * *